US007240136B2

(12) United States Patent
Anand (10) Patent No.: US 7,240,136 B2
(45) Date of Patent: Jul. 3, 2007

(54) SYSTEM AND METHOD FOR REQUEST PRIORITY TRANSFER ACROSS NODES IN A MULTI-TIER DATA PROCESSING SYSTEM NETWORK

(75) Inventor: Vaijayanthimala K. Anand, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 11/014,070

(22) Filed: Dec. 16, 2004

(65) Prior Publication Data
US 2006/0136574 A1 Jun. 22, 2006

(51) Int. Cl.
*G06F 13/38* (2006.01)
(52) U.S. Cl. .................. 710/244; 709/240; 718/105
(58) Field of Classification Search ............... 710/242, 710/309; 707/1; 709/206, 229, 238; 370/230, 370/311, 401; 711/117; 726/13
See application file for complete search history.

(56) References Cited

U.S. PATENT DOCUMENTS

| 6,717,949 | B1 * | 4/2004 | Boden et al. ............... 370/401 |
|---|---|---|---|
| 6,725,332 | B2 * | 4/2004 | Leenstra et al. ............ 711/117 |
| 6,741,559 | B1 * | 5/2004 | Smeulders et al. ......... 370/230 |
| 6,754,716 | B1 * | 6/2004 | Sharma et al. .............. 709/238 |
| 7,024,460 | B2 * | 4/2006 | Koopmas et al. ........... 709/206 |
| 7,093,288 | B1 * | 8/2006 | Hydrie et al. ................. 726/13 |
| 2004/0177150 | A1 * | 9/2004 | Kogan ........................ 709/229 |
| 2005/0021491 | A1 * | 1/2005 | Horgan ......................... 707/1 |
| 2005/0270993 | A1 * | 12/2005 | Rajamani et al. ........... 370/311 |

OTHER PUBLICATIONS

Not assigned/ AUS920040471US1, Anand, Method, Computer Program Product, and Data Processing System for Data Queuing Prioritization in a Multi-Tiered Network.
Not Assigned/ AUS920041049US1, Anand, System and Method for Connection Capacity Reassignment in a Multi-Tier Data Processing System Network.

* cited by examiner

*Primary Examiner*—Christopher E Lee
(74) *Attorney, Agent, or Firm*—Duke W. Yee; Marilyn Smith Dawkins; Peter B. Manzo (57) ABSTRACT

A method, computer program product, and a data processing system for transferring request prioritizations in a data processing system network is provided. A first data processing system receives a transaction request and identifies a priority of the transaction request. The first data processing system processes and conveys the transaction request to a second data processing system according to the priority, and the second data processing system processes the transaction request according to the priority.

20 Claims, 6 Drawing Sheets

SYSTEM AND METHOD FOR REQUEST PRIORITY TRANSFER ACROSS NODES IN A MULTI-TIER DATA PROCESSING SYSTEM NETWORK

RELATED APPLICATIONS

This application is related to commonly assigned and U.S. patent application Ser. No. 11/014,069 entitled "METHOD, COMPUTER PROGRAM PRODUCT, AND DATA PROCESSING SYSTEM FOR DATA QUEUING PRIORITIZATION IN A MULTI-TIERED NETWORK," and U.S. patent application Ser. No. 11/014,110 entitled "SYSTEM AND METHOD FOR CONNECTION CAPACITY REASSIGNMENT IN A MULTI-TIER DATA PROCESSING SYSTEM NETWORK" which are hereby incorporated by reference.

BACKGROUND OF THE INVENTION

1. Technical Field

The present invention relates generally to an improved data processing system and, in particular, to a mechanism for prioritization in a multi-tier environment. Still more particularly, the present invention provides a mechanism for transferring request priorities across related nodes, that is nodes required in processing a given transaction, job, or the like, in a multi-tier data processing system network.

2. Description of Related Art

Various networked data processing system traffic control schemes for queuing and filtering network traffic are used for providing service level agreement (SLA) traffic prioritization. For example, the Linux network stack has infrastructure for traffic control that has queuing disciplines (qdisc) and filters. A hierarchy of qdiscs can be constructed jointly with a class hierarchy to support Quality of Service (QoS) features. Traffic can be routed to different classes by employing filters that are matched against packet header fields. However this is available only for the transmit side of the network protocol stack.

For the receive side, that is the server side in a client-server network or receive side of any one of the server systems in the multi-tier environment, prioritization is provided on a connection basis. For example, when an incoming connection is established, the connection may be prioritized based on one or more priority filters to queue the connection in one of a plurality of queues allocated to different priority classes. Based on this, priority connections are established. This priority assignment is referred to as connection queuing and is implemented as part of the three-phase connection process in the TCP/IP protocol. In such systems, client prioritization is enforced only at connection time. As a result, the processing of requests from a higher priority client is started before a lower priority client request is processed. However, this does not guarantee that processing of data from higher priority clients is performed before data from a lower priority client as the priority is not enforced at the data frame level.

It would be advantageous to provide a mechanism for frame-level prioritization for providing SLA prioritization queuing of inbound traffic at a server providing not only connection time priority but also data processing priority to clients of different priorities. It would be further advantageous to provide a mechanism for providing frame-level prioritization in a multi-processor environment for priority queuing of incoming traffic on a per-processor basis.

Moreover, processing of a transaction may span across a plurality of systems in a multi-tier data processing system network. For example, a client may start a transaction with a web server, and the webserver, in turn, may be required to access a backend database server, route the request to another webserver, or access a web application server to complete the transaction request. Therefore, the first tier web server, in turn, may require connection with a web application server, which eventually may end up connecting to a database server to complete the processing. No mechanisms exist for transferring a network priority across multiple systems involved in processing of a transaction for network layer processing.

It would be advantageous to provide a mechanism to transfer a priority class across multiple nodes that are involved in processing a single transaction or job in a data processing system network. It would further be advantageous to provide a mechanism to transfer a priority class that includes the priority at the connection level and at the inbound data frame level in a multi-tier data processing system network.

SUMMARY OF THE INVENTION

The present invention provides a method, computer program product, and a data processing system for enforcing priority levels at the frame level including inbound data frame processing of the network protocol stacks. In symmetrical multi-processor systems and in non-uniform memory access systems, the priority levels are enforced by using multiple data queues per processor in single or multiple nodes. Additionally, the present invention provides a method, computer program product, and a data processing system for transferring request prioritizations to be enforced at the network layer in a multi-tier data processing system network. A first data processing system receives a transaction request and identifies a priority of the transaction request. The data processing system then conveys the transaction request to a second data processing system, and the second data processing system processes the transaction request according to the priority.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
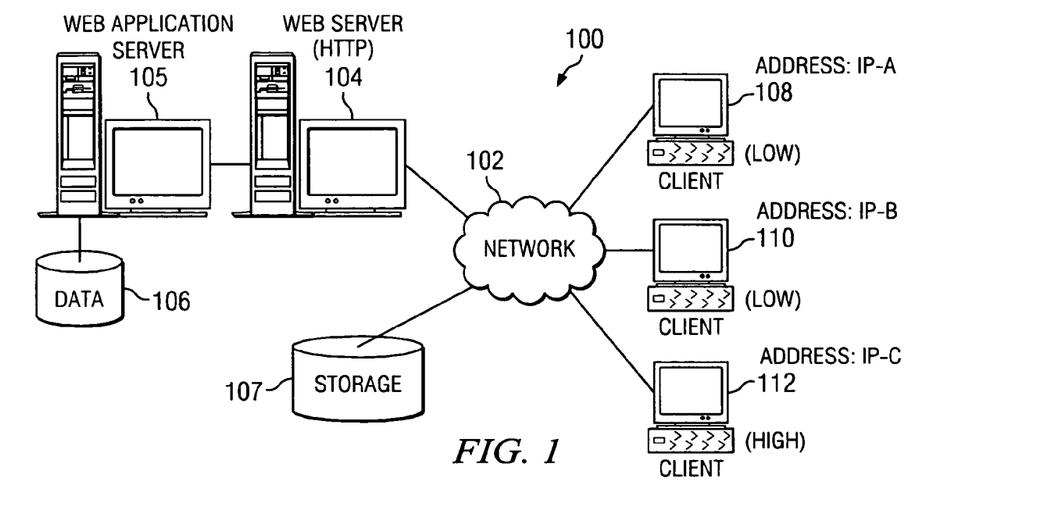
FIG. 1 depicts a pictorial representation of a multi-tier network of data processing systems in which a preferred embodiment of the present invention may be implemented.

With reference now to the figures, FIG. 1 depicts a pictorial representation of a multi-tier network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, web server 104 is connected to network 102 along with storage unit 107. In addition, clients 108, 110, and 112 are connected to network 102. These clients 108, 110, and 112 may be, for example, personal computers or network computers. In the depicted example, web server 104 may be implemented as an HTTP server that sends web pages to clients 108–112 responsive to receiving an HTTP request from, for example, browsers running on clients 108–112. Additionally, web server 104 may provide data other than HTTP data, such as applications, to clients 108–112. Clients 108, 110, and 112 are clients to web server 104. Web server 104 interfaces and communicates with web application server 105. Web application server 105 handles application operations between browser-issued requests issued by clients 108–112 and back end applications or databases maintained by data store 106, such as a backend database system, that interfaces with web application server 105.

Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
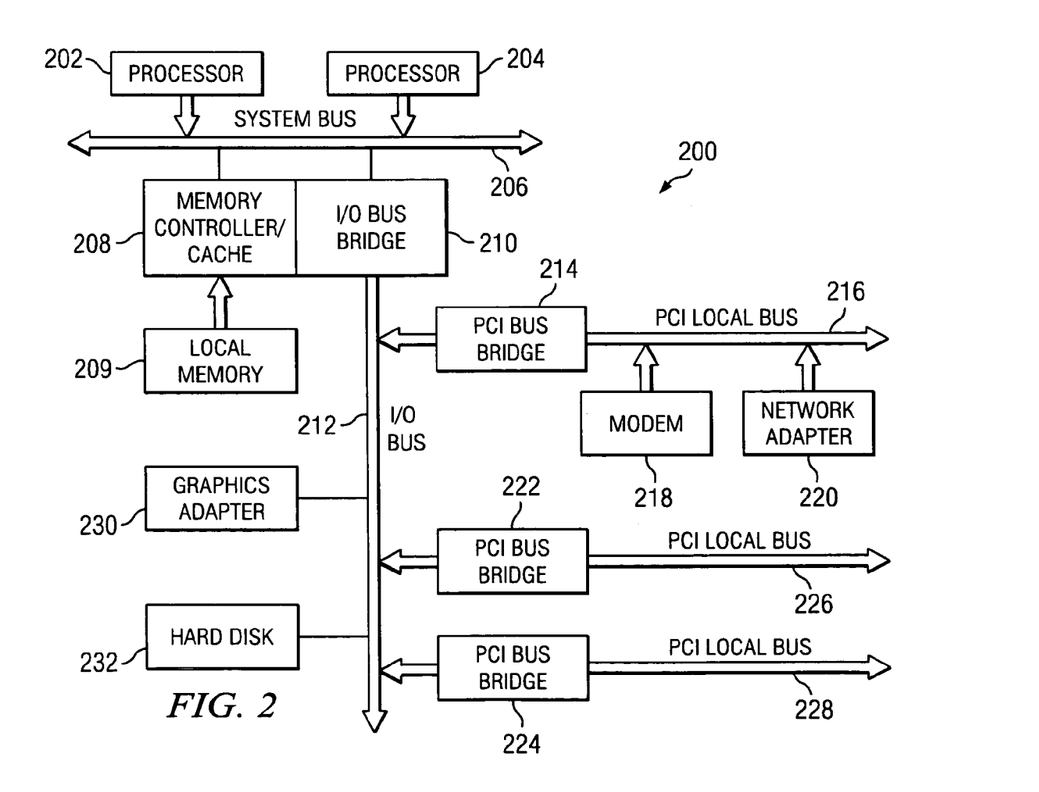
FIG. 2 is a block diagram of a data processing system that may be implemented as a server depicted in accordance with a preferred embodiment of the present invention.

Referring to FIG. 2, a block diagram of a data processing system that may be implemented as a server, such as web server 104 or web application server 105 in FIG. 1, is depicted in accordance with a preferred embodiment of the present invention. Data processing system 200 may be a symmetric multiprocessor (SMP) system including a plurality of processors 202 and 204 connected to system bus 206 although other multi-processor configurations may be suitably substituted therefor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
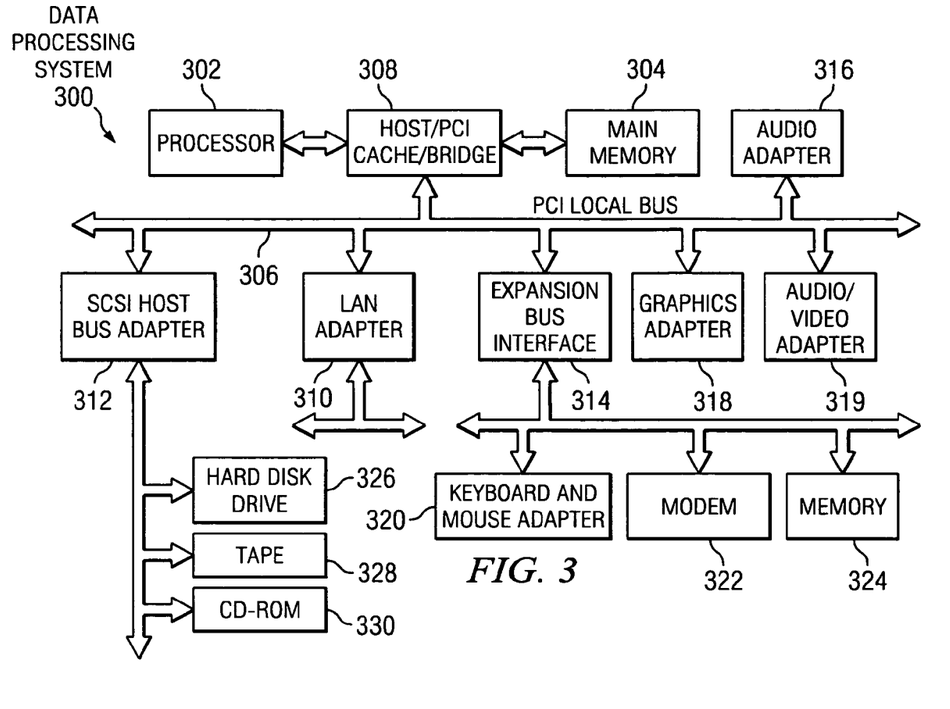
FIG. 3 is a block diagram illustrating a client data processing system that may have data prioritized in accordance with a preferred embodiment of the present invention.

With reference now to FIG. 3, a block diagram illustrating a data processing system is depicted in which the present invention may be implemented. Data processing system 300 is an example of a client computer, such as client 108 shown in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

A client, such as client 108, initiates a communication connection with web server 104. In the illustrative examples provided herein, communication connections between a client and server are described with reference to the TCP/IP protocol suite, although other communication protocols may be suitably substituted therefor. Implementations of the present invention are not limited to any particular protocol and those described are provided only to facilitate an understanding of the invention.

Figure 4:
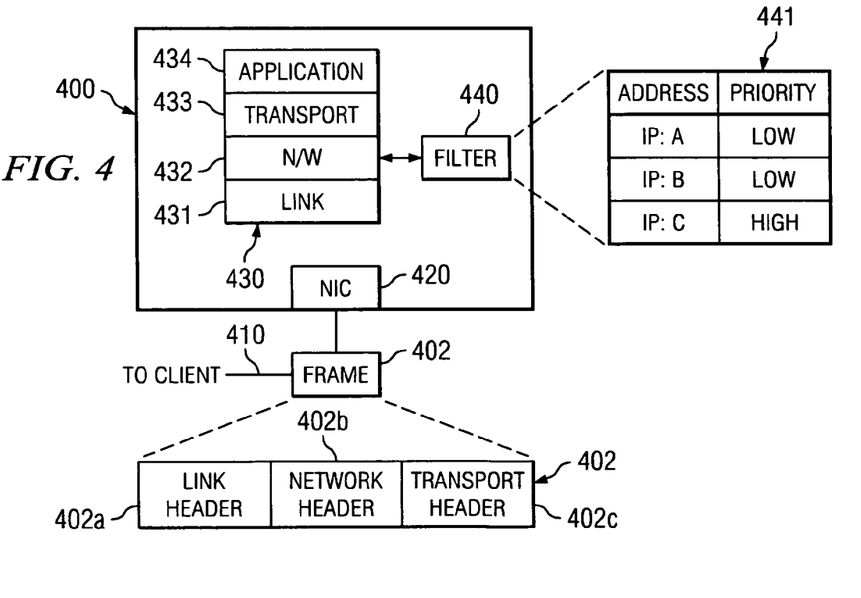
FIG. 4 is a diagrammatic illustration of a server configuration for enforcing data prioritization on a network level in accordance with a preferred embodiment of the present invention.

FIG. 4 is a diagrammatic illustration of a server configuration for enforcing data prioritization on a network level in accordance with a preferred embodiment of the present invention. Server 400 is an example of a data processing system, such as data processing system 200 shown in FIG. 2, that provides connectivity to clients of different priority classes and is implemented as a multi-processor data processing system. A client, such as client 108, will initiate a communication connection with server 400 by first engaging in a handshake with server 400. To establish a connection, a client addresses frame 402 to server 400 and applies frame 402 to network media 410, e.g., a 10 baseT, 100 baseT, or other suitable network media. Frame 402 comprises various encapsulated headers. In the present example, the client and server connect over the internet and thus frame 402 comprises a link header 402a, e.g., an Ethernet header, network layer header 402b, e.g., an IP header, and transport layer header 402c, e.g., a TCP header. For example, frame 402 may encapsulate a synchronization (SYN) segment comprising transport layer header 402c having an asserted SYN flag for initiating a handshake with server 400. Server 400 receives frame 402 via network interface card 420, e.g., an Ethernet card, that conveys the frame to link layer 431, e.g., an Ethernet driver, of network stack 430. Link layer 431 decapsulates, or demultiplexes, the IP datagram from the frame and passes the IP datagram to network layer 432 of network stack 430. Network layer 432 demultiplexes the TCP segment from the IP datagram and passes the TCP segment to transport layer 433 of network stack 430. Network stack 430 also includes application 434.

In accordance with a preferred embodiment of the present invention, filter 440 additionally receives the demultiplexed IP datagram for priority filtering of the imminent connection. Filter 440 preferably comprises logic for determining a priority-level of the client that originated the data. For example, filter 440 may determine a priority level of the client based on a source address, e.g., an IP source address, and port number read from the network layer header 402b in frame 402. The determination of the priority level is made by comparing one or more data values from frame 402 with pre-established criteria that is coded in, or accessed by, filter 440. In the illustrative example, filter 440 includes (or interfaces with) table 441 that associates or maps client addresses, e.g., IP network addresses, with priority levels that are associated with clients, for example according to service level agreements (SLAs) to which clients are subscribed. Table 441 is illustrative only and various other data structures that associate a client identifier, e.g., a network address, and a priority level may be suitably substituted therefor. As shown in FIG. 1, clients 108–112 having respective IP addresses of IP-A, IP-B and IP-C, and table 441 associates priority levels of low, low, and high, respectively, to clients 108–112. After (or concurrently with) identification of the client priority, the web server and client complete the connection, for example by completion of a three-way handshake. In accordance with a preferred embodiment of the present invention, traffic received by the web server after establishment of the connection with a client is priority filtered at a network layer on a per-processor basis in accordance with a client priority identified at connection of the client with the server.

Figure 5:
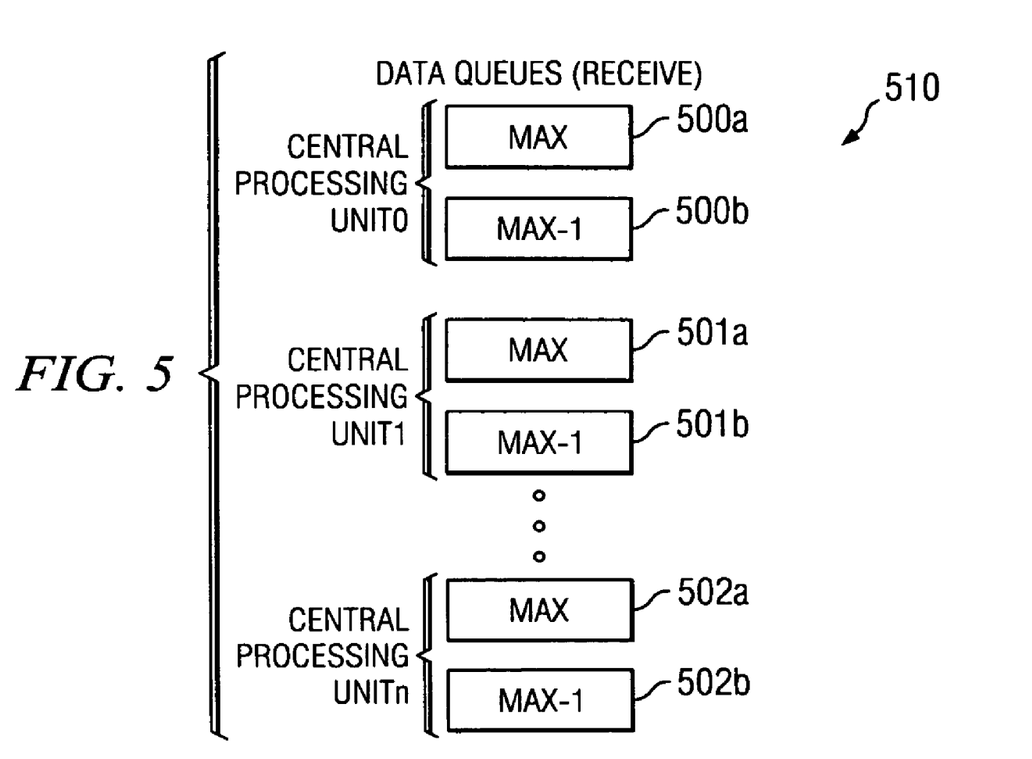
FIG. 5 is a data queue diagram configuration for service level agreement prioritization on a multi-processor server in a multi-tier network in accordance with a preferred embodiment of the present invention.

FIG. 5 is a data queue diagram configuration for service level agreement prioritization on a multi-processor server in a multi-tier network in accordance with a preferred embodiment of the present invention. Data queue configuration 510 may be implemented as computer-readable instructions stored in a memory, such as local memory 209, and fetched therefrom by a processing unit, such as processor 202 or 204 shown in FIG. 2. In the illustrative example, assume web server 104 is a symmetric multi-processor system comprising n central processing units (designated CPU0-CPUn). In the illustrative example, each of processors CPU0-CPUn respectively have two queues allocated thereto for bi-level prioritization. Particularly, processor CPU0 has two queues 500a and 500b for bi-level prioritization queuing of data received by web server 104 from clients having one of two priority levels assigned thereto. In the present example, queue 500a is allocated for data received from clients of a first (max) priority, and queue 500b is allocated for frames received from clients of a low (max-1) priority. In the illustrative examples, queues of two priorities per processor are shown. However, the bi-level prioritization provided in the examples is illustrative only and is chosen to facilitate an understanding of the invention, and any number of processor queues and corresponding client priority levels may be substituted for the configuration shown.

In a similar manner, other processors within the web server have similarly configured queues. In the illustrative example, processor CPU1 has queue 501a allocated for data received from high priority clients, and queue 501b is allocated for data received from clients of a low priority. Likewise, processor CPUn has queues 502a–502b allocated for respective data received from high and low priority clients.

Figure 6:
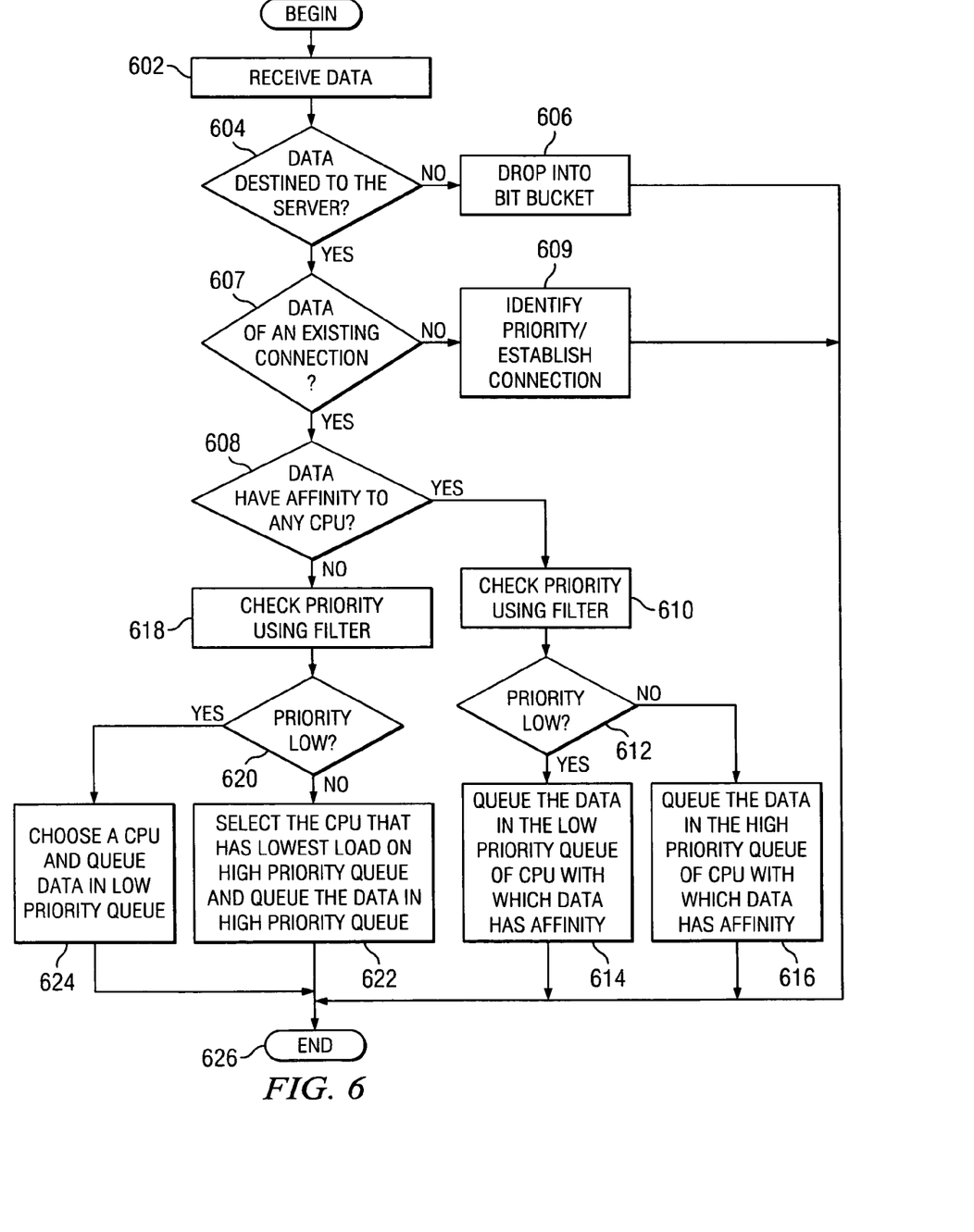
FIG. 6 is a flowchart of a data queuing routine run on a server in accordance with a preferred embodiment of the present invention.

FIG. 6 is a flowchart of a data queuing routine run on a server, such as server 400 shown in FIG. 4, providing prioritized services to clients in accordance with a preferred embodiment of the present invention. The priority queuing routine shown in FIG. 6 is executed at a network layer, for example within network stack 430 shown in FIG. 4. The routine begins and awaits receipt of data. On receipt of the data (step 602), an evaluation is made to determine that the data was targeted to the receiving system (step 604), e.g., by evaluation of the destination address in network layer header 402b. In the event the data was not destined for the receiving system, the data is dropped into a bit bucket or otherwise discarded (step 606), and the data queuing routine cycle ends (step 626).

Returning again to step 604, in the event that the data is destined to the receiving system, an evaluation is then made to determine if the data comprises traffic of an existing connection (step 607). For example, a source address and port number of the data may be read and compared with existing connection sockets. If the data is not part of an existing connection, a priority level of the client that originated the data is identified, and a connection with the client is established (step 609). The data queuing routine cycle then ends according to step 626.

Returning again to step 607, if the data is traffic of an existing connection, an evaluation is then made to determine if the data has affinity with any of the system CPUs (step 608). As referred to herein, data is said to have affinity with a processor when the processor, or resources associated with the processor such as a cache system or the like, holds data, such as context data, necessary for processing of the data. If the data is identified as having affinity for any of the system processors, a priority of the data is then identified (step 610). For example, the source address of network layer header 402b may be read and compared to a predefined criteria that correlates source addresses and priority levels as defined or accessed by filter 440 shown in FIG. 4. An evaluation of the priority is then made (step 612). In the event the data priority is evaluated as low at step 612, the data is placed in the low priority queue of the processor with which the frame is identified as having affinity (step 614), and the prioritization routine cycle then ends according to step 626. Alternatively, if the data is evaluated as high priority data at step 612, the data is placed in the high priority queue of the processor with which the data is identified as having affinity (step 616). The prioritization routine cycle then ends according to step 626.

Returning again to step 608, if the data is not identified as having affinity with any system processors, the priority level of the frame is then checked (step 618), and an evaluation is then made to determine if the data was originated from a client having a low priority (step 620). If it is determined that the data originated from a client having a low priority, a CPU is then chosen and the data is placed in a low priority queue of the chosen CPU (step 624). For example, a CPU chosen for queuing of the data may be made by a round robin selection routine. Other scheduling mechanisms may be suitably substituted therefor. Once the data is placed in a low priority queue of a CPU, the prioritization routine cycle then ends according to step 626.

Returning again to step 620, in the event that the data is identified as originating from a high priority client (that is, the client priority is not identified as a low priority at step 620), the data is placed in a high priority queue of one of the system processors (step 622), for example by selecting the processor that has the lowest number of tasks in its respective high priority queue. The prioritization routine cycle then ends according to step 626.

Data is then retrieved from the processor queues based on the queue priority for transmission of the data across the network. For example, data queued on a per-processor basis at web server 104 shown in FIG. 1 that comprises a database transaction to be performed on data store 106 is transmitted from web server 104 to web application server 105 according to the data prioritization, that is with processing precedence provided to higher priority requests with respect to lower priority requests.

Thus, the transmission of data during processing of a transaction in a multi-processor data processing system deployed in a multi-tier network is made in accordance with client priority classes. By allowing multiple queuing mechanisms at the data queue level in the TCP/IP network stack and correlating the connection priority with the data priority, higher priority clients are ensured to get requests serviced before a lower priority client.

Figures 7A, 7B:
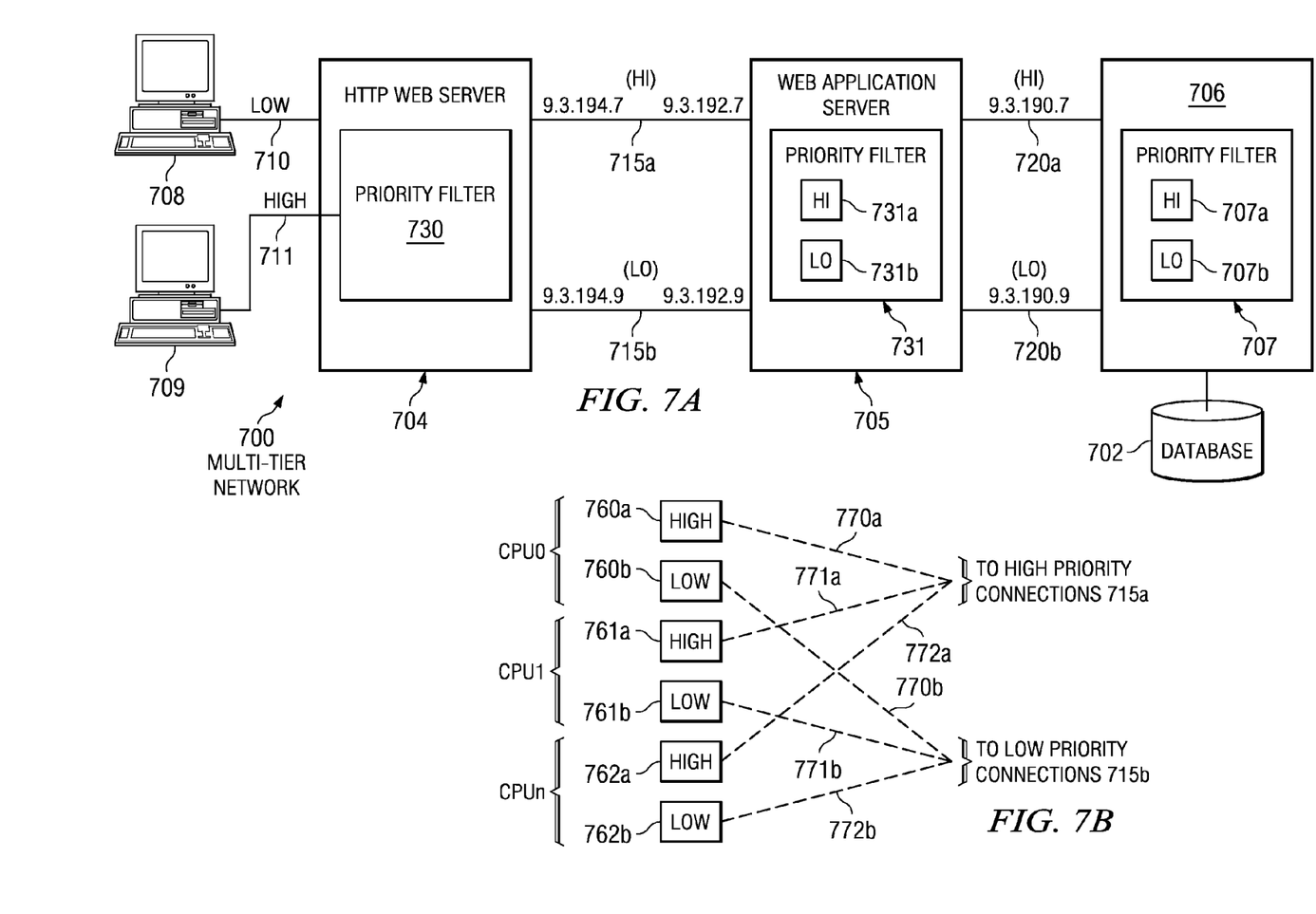
FIG. 7A is a diagrammatic illustration of a client-server network system in which request priority transfers are implemented according to a preferred embodiment of the present invention.
FIG. 7B is a diagrammatic illustration of a priority filter that facilitates transferring request priority classes across nodes in a network of data processing systems in accordance with a preferred embodiment of the present invention.

In accordance with another embodiment of the present invention, a mechanism for extending or transferring request priorities from node-to-node in a multi-tier network system is provided. FIG. 7A is a diagrammatic illustration of a multi-tier network system in which data priority transfers are implemented according to a preferred embodiment of the present invention. In the illustrative example, a web server 704 implemented as an HTTP server sends web pages or other data to clients 708 and 709 by way of respective client connections 710 and 711 responsive to receiving HTTP requests therefrom. Additionally, web server 704 may provide data other than HTTP data, such as applications, to clients 708 and 709. Web server 704 interfaces and communicates with web application server 705. Web application server 705 handles application operations between browser-issued requests issued by clients 708 and 709 and back-end applications or databases, such as back-end database server 706 that interfaces with web application server 705 and that executes database transactions on database 702.

In general, respective connections 710 and 711 between clients 708 and 709 and web server 704 are established as dynamic or short-lived connections. Connections 715a–715b and 720a–720b respectively interconnecting web server 704 with web application server 705 and web application server 705 with backend database server 706 are persistent connections. In accordance with a preferred embodiment of the present invention, a priority of a transaction request submitted by a client that is received at web server 704 is identified by web server 704 as described above. The priority is then propagated to a persistent connection with back-end database server 706. To this end, web server 704, during establishment of persistent connections 715a–715b with web application server 705, assigns priorities to connections 715a–715b. Likewise, application server 705, during establishment of persistent connections 720a and 720b with back-end database server 706, assigns priorities to connections 720*a* and 720*b*. In the illustrative example, each of connections 715*a*–715*b* and 720*a*–720*b* are representative of one or more similar connections. For example, connections 715*a* may be implemented as a pool of a plurality of connections each assigned (or collectively assigned) a common priority. In the present example, connections 715*a* and 720*a* are respectively representative of one or more connections of a first priority class, high (HI), and connections 715*b* and 720*b* are respectively representative of one or more connections of a second, lower priority class, low (LO).

Prioritized processing of client requests is provided by transferring, or extending, priority processing across all nodes involved in processing a client request. Each of the nodes involved in processing the transaction, e.g., web server 704, web application server 705, and backend database server 706, provides priority precedence in processing of data. For example, web server 704, on receipt of data from a client, identifies a priority of the client data by, for example, the mechanisms described above with respect to FIG. 4. Data is then queued and processed at web server 704 according to the data priority corresponding to the client priority level identified by web server 704. For example, assume web server 704 has received and queued both high priority data of a transaction request from a high priority client to be processed by backend database server 706 and low priority data of a transaction request from a low priority client to be processed by backend database server 706. The high priority data is transmitted to web application server 705 prior to transmission of the low priority data due to the processing precedence provided to the high priority client. Web application server 705, in turn, processes the data received from web server 704 according to the client data priority. In accordance with one embodiment of the present invention, web application server 705 priority processes data according to the connection on which the data is received at web application server 705. In the illustrative example, data received by web application server 705 via HI priority connections 715*a* is placed in high priority queue 731*a* of (or interfaced with) priority filter 731, and data received by web application server 705 via LO priority connections 715*b* is placed in low priority queue 731*b* of (or interfaced with) priority filter 731. Accordingly, high priority data processed and transmitted with precedence over low priority data by web server 704 is likewise provided processing precedence by web application server 705. Web application server 705, in turn, transmits high priority data to backend database server 706 with precedence over low priority data. Thus, the backend system (backend database server 706 in the present example) may queue and process high priority data with greater precedence over lower priority data. In the illustrative example, backend database server 706 places high priority data in high priority queue 707*a* of (or interfaced with) filter 707, and places low priority data in low priority queue 707*b* of(or interfaced with) priority filter 707. Thus, by configuring each node to identify data priority based on a connection by which the data is received, prioritized processing is provided across each tier involved in transaction The priority of processing data is reciprocally provided in multi-tier network 700. That is, data received (e.g., return data resulting from execution of a database transaction by backend database server 706) by web application server 705 via a priority class HI connection 720*a* from backend database server 706 is provided greater processing precedence by web application server 705 than transactions received via priority class LO connections 720*b*. Likewise, data received by web server 704 from web application server 705 via HI priority connections 715*a* is provided greater processing precedence than data received by web server 704 from web application server 705 via low priority connections 715*b*. Thus, prioritization of transaction processing is provided in multi-tier network 700 during both transaction request and transaction return messaging.

With reference now to FIG. 7B, a diagrammatic illustration of prioritized data queues configured to facilitate data processing prioritization transfer in a multi-tier network is shown in accordance with a preferred embodiment of the present invention. Data queues 760*a*–762*b* may be implemented as computer-readable instructions stored in a memory, such as a local memory, and fetched therefrom by a processing unit of a server system deployed as a front-end node in multi-tier network 700. Data queues 760*a*–762*b* are preferably implemented within, or interface with, a priority filter, such as priority filter 730 run by web server 704. Data queues 760*a*–762*b* are examples of per-processor data queues, such as queues 500*a*–502*b* shown in FIG. 5, for frame-level data queuing as described above.

In the present example, high priority queues 760*a*, 761*a*, and 762*a* are logically mapped to high priority connections 715*a*, and low priority queues 760*b*, 761*b*, and 762*b* are logically mapped to low priority connections 715*b*. Logical mappings 770*a*–772*b* for associating respective queues 760*a*–762*b* with connections of a particularly priority may be implemented by, for example, a linked list, relational database, or any other suitable data structure. Thus, data queued in high priority queues 760*a*–762*a* to be transmitted to web application server 705 is provided precedence for transmission via high priority connections 715*a* over data queued in low priority queues 760*b*–762*b* for transmission via low priority connections 715*b*. In the illustrative examples, queues and connections of two priority classes are shown. However, the bi-level prioritization provided in the examples is illustrative only and is chosen to facilitate an understanding of the invention, and any number of queues and connection priority levels may be substituted for the configuration shown.

Figure 7C:
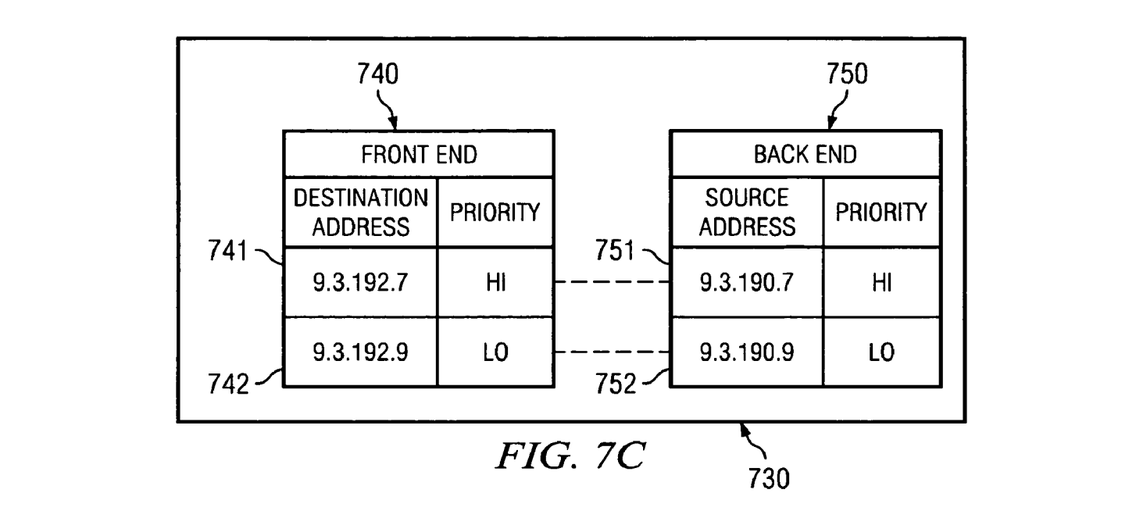
FIG. 7C is a diagrammatic illustration of a priority filter that maps client connections to back-end connections for transferring priority classes across nodes in a multi-tier network of data processing systems is shown in accordance with a preferred embodiment of the present invention.

To facilitate transfer of processing priorities across nodes of multi-tier network 700, priority filters are implemented in each node involved in processing of the transaction. With reference now to FIG. 7C, a diagrammatic illustration of a priority filter that maps client connections to back-end connections for transferring priority classes across nodes in a multi-tier network of data processing systems is shown in accordance with a preferred embodiment of the present invention. Priority filter 731 is preferably implemented as a set of computer-readable instructions and may be implemented in, or interface with, a network stack of the host server, e.g., web application server 705, running priority filter 731.

In intermediate nodes, i.e., nodes that receive data to be processed and that must forward data to another node in multi-tier network 700, transfer of priority classes is facilitated by logical mappings between front-end and back-end server addresses. In the illustrative example, web application server 705 has two network addresses through which front-end connections may be made with web server 704, namely IP addresses 9.3.192.7 and 9.3.192.9, and web application server 705 has two network addresses through which back-end connections may be made with back-end database server 706, namely IP addresses of 9.3.190.7 and 9.3.190.9. In accordance with embodiments of the invention, priority classes are transferred from a requesting entity to a target entity via an intermediate server of multi-tier network 700 by way of mappings between prioritized connections. To this end, associations between web application server front-end addresses and back-end address are defined by filter 731. In the illustrative example, table 740 defines front-end (destination) addresses at which data is received by web application server 705, e.g., from web server 704 on behalf of clients 708 and 709 and corresponding priorities of the front-end addresses. Particularly, record 741 of table 740 defines a priority class of HI for requests received by web application server 705 with a destination address of 9.3.192.7, and record 742 of table 740 defines a priority class of LO for requests received by web application server 705 with a destination address of 9.3.192.9. Another table 750 defines source (back-end) addresses with which web application server 705 connects with back-end database server 706 and corresponding priorities for the back-end addresses. Particularly, record 751 of table 750 defines a priority class of HI for connections with back-end database server 706 established with the web application server source address of 9.3.190.7, and record 752 of table 750 defines a priority class of LO for connections with back-end database server 706 established with the web application server source address of 9.3.190.9. Thus, on identification of a priority of data received by web application server 705, the request priority may be transferred to the back-end database by sending the request on a connection that has a corresponding priority. For example, assume a request for a database query is issued by client 708 and is received by web application server 705 from web server 704. The request is analyzed to determine the destination address to which the request was directed. On identification of the destination address of the request, a priority of the request is determined based on the association of the destination address and priority class. Alternatively, the request priority may be identified by way of the connection on which the data is received by web application server 705. For example, web application server 705 may simply identify any data received over connections 715a as high priority data and any data received over connections 715b as low priority data.

Upon identification of the data priority, a source address that corresponds to the determined priority class is then identified and the request is communicated to the back-end service via the source address that has a corresponding priority.

As an example, assume a request from client 708 is sent to web application server 705 via web server 704 and that web server 704 connects with web application server 705 by addressing a request to the low priority front-end address (9.3.192.9) of web application server 705. For example, web server 704 may connect with web application server 705 on low priority connection 715b that terminates at the low priority front-end address of web application server 705 after identifying client 708 as having a low priority SLA. Such an identification of client 708 may be made by a filter mechanism that identifies client priority SLAs, such as filter 441 shown and described in FIG. 4. On receipt of the request data by the web application server, the request is supplied to priority filter 731 and the front-end address at which the data was received by web application server 705 is read. In the present example, priority filter 731 reads the front-end address of web application server 705 to which the request was addressed and identifies the request as a LO priority address by way of the front end destination address and priority association defined in record 742.

On identification of the request as a LO priority request, web application server 705 then communicates the request to back-end database server 706. Particularly, web server 705 includes the low priority source address (9.3.190.9) in the request and supplies the request to low priority connection 720b for communication to back-end database server 706.

Accordingly, by implementing a priority filter in back-end database server 706 that queues requests according to the request priority, backend database server 706 may process requests according to predefined priority classes that have been originally identified at a front-end node of multi-tier network 700, e.g., web server 704, and that has been propagated through each node involved in conveying the transaction request to backend database server 706. In the illustrative example, back-end database server 706 includes priority filter 707 that provides a higher precedence to requests received over high priority connection 720a than requests received over low priority connection 720b. Particularly, priority filter 707 includes, or interfaces with, high priority queue 707a and low priority queue 707b in which requests received over respective high priority connections 720a and low priority connections 720b are queued. Accordingly, processing of requests received at back-end database server 706 may be performed according to priority classifications that are transferred between multiple tiers in a network of data processing systems.

Figure 8:
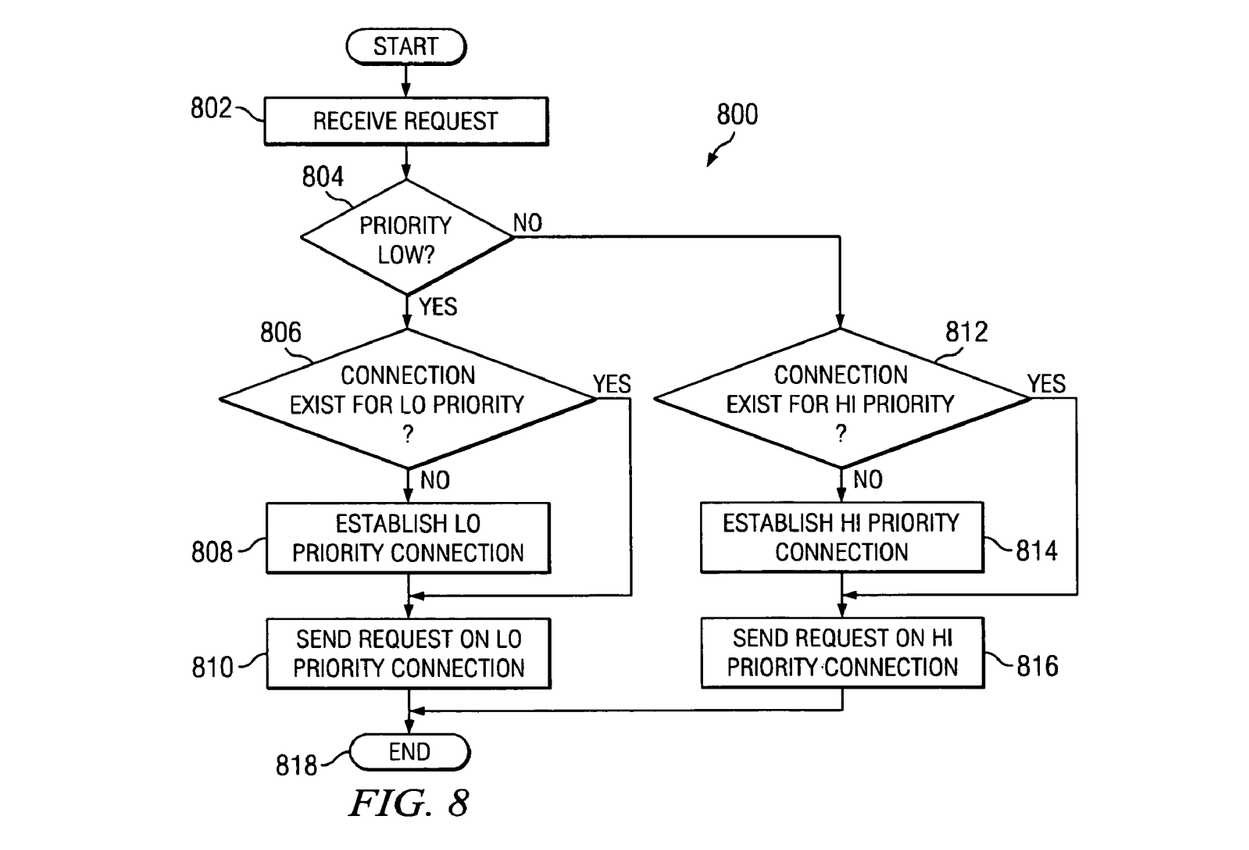
FIG. 8 is a flowchart of runtime processing performed by a priority filter for transferring request priorities across nodes in a data processing system network in accordance with a preferred embodiment of the present invention.

FIG. 8 is a flowchart of runtime processing performed by a priority filter for transferring request according to request priorities across nodes in a data processing system network in accordance with a preferred embodiment of the present invention. The runtime routine processing depicted in flowchart 800 is preferably implemented by computer-readable instructions implemented as a filter, such as priority filter 730, that is processed by a data processing system, such as web application server 705 and is used to dispatch queued data from prioritized queues.

The runtime priority filter routine begins, for example, on system boot or another invocation, and awaits receipt of a request, such as a database transaction request or other back-end service transaction. On receipt of the request (step 802), e.g., upon dispatch from a queue, an evaluation of the request priority is made by the priority filter (step 804). In particular, the request is evaluated to determine if the request is a low priority request. In the event the request is evaluated as a low priority request, the run-time priority filter routine proceeds to evaluate whether a connection exists for LO priority requests (step 806). If a low priority connection does not exist, one is established (step 808) and the routine then proceeds to send the request on the newly established LO priority connection (step 810). If, at step 806, it is determined that a LO priority connection already exists, e.g., low priority connections 720b in FIG. 7A, the runtime priority filter routine then proceeds to send the request on the LO priority connection according to step 810. After the request is send via the LO priority connection, the runtime priority filter cycle then completes (step 818).

Returning again to step 804, if the request is not evaluated as a LO priority request, an evaluation is made to determine if a HI priority connection exists (step 812). If a HI priority connection does not exist, one is established (step 814) and the routine then proceeds to send the request on the newly established HI priority connection (step 816). If, at step 812, it is determined that a HI priority connection already exists, e.g., high priority connections 720a, the runtime priority filter routine then proceeds to send the request on the HI priority connection according to step 816. After the request is sent via the HI priority connection, the runtime priority filter cycle then completes according to step 818.

Thus, by implementing data prioritization at the backend service, e.g., in filter 707, data processing priority is provided to clients of different priorities in a multi-tier network. For example, filter 707 may include high priority queue 707a and low priority queue 707b for providing precedence for data received over high priority connections 720a and low priority connections 720b.

It should be understood that the examples of bi-priority request filtering and priority transfers are illustrative only, and the teachings of the invention may be extended to a system having any number of request priority classes.

As described, embodiments of the present invention provide mechanisms for transferring request priorities across nodes in a network of data processing systems. By transferring request priorities across multiple nodes in a data processing system network, the precedence of request processing is ensured in any node involved in conveying or processing of a transaction in a multi-tiered data processing system network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of transferring request prioritizations in a dataprocessing system network, the method comprising:
   receiving, by a first data processing system, a transaction request;
   identifying a priority of the transaction request; processing, by the first data processing system, the transaction request in a network layer of the first data processing system according to the priority; and
   conveying the transaction request to a second data processing system, wherein the second data processing system processes the transaction request in a network layer of the second data processing system according to the priority.

2. The method of claim 1, wherein said identifying is performed by a filter interfaced with a network stack of the first data processing system.

3. The method of claim 1, wherein the first data processing system comprises a front-end node of the second data processing system.

4. The method of claim 1, further comprising:
   establishing a plurality of connections between the first data processing system and the second data processing system, wherein a first connection of the plurality of connections has a first priority associated therewith and a second connection of the plurality of connections has a second priority associated therewith.

5. The method of claim 4, wherein said conveying further comprises:
   determining that the priority of the transaction request corresponds to the first priority; and
   transmitting the transaction request on the first connection.

6. The method of claim 1, wherein said identifying further comprises:
   determining a destination address of the first data processing system to which the transaction request was addressed.

7. The method of claim 6, further comprising:
   mapping the destination address to a source address of the first data processing system, wherein the source address is a source address of a connection between the first data processing system and the second data processing system, and wherein the source address is associated with the priority.

8. A computer program product in a computer readable storage medium for transferring request prioritizations in a data processing system network, the computer program product comprising:
   first instructions that receive a transaction request at a first data processing system;
   second instructions that identify a priority of the transaction request;
   third instructions that process the transaction request at a network layer of the first data processing system; and
   fourth instructions that convey the transaction request to a second data processing system for processing of the transaction request at a network layer of the second data processing system according to the priority.

9. The computer program product of claim 8, wherein the second instructions comprise a filter interfaced with a network stack of the first data processing system.

10. The computer program product of claim 8, wherein the first data processing system comprises a front-end node of the second data processing system.

11. The computer program product of claim 8, further comprising:
    fifth instructions that establish a plurality of connections between the first data processing system and the second data processing system, wherein a first connection of the plurality of connections has a first priority associated therewith and a second connection of the plurality of connections has a second priority associated therewith.

12. The computer program product of claim 11, wherein the fourth instructions further comprise:
    sixth instructions that determine that the priority of the transaction request corresponds to the first priority; and
    seventh instructions that transmit the transaction request on the first connection.

13. The computer program product of claim 8, wherein the second instructions further comprise:
    fifth instructions that determine a destination address of the first data processing system to which the transaction request was addressed.

14. The computer program product of claim 13, further comprising:
   sixth instructions that map the destination address to a source address of the first data processing system, wherein the source address is a source address of a connection between the first data processing system and the second data processing system, and wherein the source address is associated with the priority.

15. A data processing system for transferring request prioritizations in a data processing system network, comprising:
   a network interface card that receives a transaction request;
   a memory that contains a priority filter as a set of instructions; and
   a processing unit, responsive to execution of the set of instructions, that identifies a priority of the transaction request and processes the transaction request at a network layer of the data processing system, and transmits the transaction request on a first connection of a plurality of connections, wherein each of the plurality of connections has an associated priority, and the first connection has a first associated priority that corresponds to the priority of the transaction request.

16. The data processing system of claim 15, wherein the priority filter is interfaced with a network stack maintained in the memory.

17. The data processing system of claim 15, wherein the priority filter identifies the priority of the transaction request by reading a destination address of the data processing system in the transaction request.

18. The data processing system of claim 17, wherein the priority filter maps the destination address with a source address of the data processing system used for sending data on the first connection.

19. The data processing system of claim 15, further comprising:
   a second network interface card that terminates the plurality of connections with a second data processing system.

20. The data processing system of claim 15, wherein the plurality of connections terminate at a second data processing system, and wherein the second data processing system is configured to process the transaction request at a network layer of the second data processing system according to the priority.

* * * * *